United States Patent
Kotaru et al.

(10) Patent No.: US 12,519,701 B2
(45) Date of Patent: Jan. 6, 2026

(54) SYSTEMS AND METHODS FOR UTILIZING MODELS TO PREDICT HETEROGENEOUS MOBILE NETWORK TRAFFIC

(71) Applicant: Verizon Patent and Licensing Inc., Basking Ridge, NJ (US)

(72) Inventors: Kiran Kotaru, Hyderabad (IN); Naveen Chintala, Hyderabad (IN); Malathi Ponniah, Bengaluru (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 18/644,026

(22) Filed: Apr. 23, 2024

(65) Prior Publication Data

US 2025/0330386 A1  Oct. 23, 2025

(51) Int. Cl.
*H04L 41/147* (2022.01)
*H04L 41/16* (2022.01)

(52) U.S. Cl.
CPC ........... *H04L 41/147* (2013.01); *H04L 41/16* (2013.01)

(58) Field of Classification Search
CPC .......... H04L 51/046; G06F 2207/4824; G06F 18/214; G06F 18/24; G06F 40/30; G06F 18/213; G06F 16/3344; G06F 16/35; G06F 18/22; G06F 18/253; G06F 40/284; G06F 30/27; G06F 40/216; G06F 40/295; G06F 18/2148; G06F 18/15; G06F 16/3329; G06F 16/9535; G06F 18/10; G06F 18/24143; G06F 18/2415; G06F 18/295; G06F 2123/02; G06F 16/353; G06F 18/2113; G06F 18/241; G06F 18/2411; G06F 18/2433; G06F 18/27; G06F 2218/12; G06F 40/205; G06F 40/211; G06F 40/242; G06F 40/289; G06F 16/215; G06F 16/3347; G06F 16/951; G06F 16/9532; G06F 16/9536; G06F 16/9538; G06F 17/16; G06F 18/217; G06N 3/08; G06N 3/044; G06N 3/045; G06N 20/00; G06N 3/084; G06N 3/0442; G06N 3/006; G06N 7/01; G06N 3/047;

(Continued)

(56) References Cited

U.S. PATENT DOCUMENTS

| 2018/0341698 A1* | 11/2018 | Wang ................. G06N 5/02 |
| 2022/0230090 A1* | 7/2022 | Batta ................. G06N 20/00 |
| 2023/0196104 A1* | 6/2023 | Kulkarni ............ G06N 3/0442 706/15 |

OTHER PUBLICATIONS

Fu, et al., "Traffic Prediction-Enabled Energy-Efficient Dynamic Computing Resource Allocation in CRAN Based on Deep Learning," Communications Society, vol. 3, Jan. 29, 2022, 17 Pages.

(Continued)

*Primary Examiner* — Djenane M Bayard

(57) ABSTRACT

A device may receive time series data associated with a mobile network, and may process the time series data, with a bidirectional-long short-term memory (Bi-LSTM) model, to generate a preliminary mobile network traffic prediction. The device may apply an adaptive waterwheel plant optimization model, to the preliminary mobile network traffic prediction, to train the Bi-LSTM model and to generate a trained Bi-LSTM model. The device may process the preliminary mobile network traffic prediction, with the trained Bi-LSTM model, to generate a final mobile network traffic prediction, and may perform one or more actions based on the final mobile network traffic prediction.

20 Claims, 9 Drawing Sheets

(58) Field of Classification Search
CPC .......... G06N 3/049; G06N 3/082; G06N 5/04;
G06N 3/0464; G06N 3/048; G06N 5/01;
G06N 3/042; G06N 3/04; G06N 3/09;
G06N 3/0455; G06N 5/022; G06N 20/20;
G06N 3/091; G06N 3/096; G06N 3/0985;
G06N 3/088; G06N 5/02; G06N 20/10;
G06N 3/0495; G06N 3/061; G06N 3/063
See application file for complete search history.

(56) References Cited

OTHER PUBLICATIONS

Dangi et al., "A novel hybrid deep learning approach for 5G network traffic control and forecasting," Concurrency Computat Pract Exper, 2022; 18 Pages.

Yang et al., "Long term 5G network traffic forecasting via modeling non-stationarity with deep learning," Communications Engineering, 2023, 12 Pages.

Santos et al., "Predicting Short-Term Mobile Internet Traffic From Internet Activity Using Recurrent Neural Networks," arXiv:2010.05741v1, Oct. 12, 2020, 17 Pages.

Uyan et al., "5G Long-Term and Large-Scale Mobile Traffic Forecasting," arXiv:2212.10869v1, Dec. 21, 2022, 9 Pages.

Perveen et al., "Dynamic traffic forecasting and fuzzy-based optimized admission control in federated 5G-open RAN networks," Neural Computing and Applications, 2023, 19 Pages.

Wang et al., "Spatial-Temporal Cellular Traffic Prediction for 5G and Beyond: A Graph Neural Networks-based Approach," IEEE Transactions on Industrial Informatics, vol. 19, No. 4, 2022, 10 Pages.

Xue et al., "Bi-Prediction: Pedestrian Trajectory Prediction Based on Bidirectional LSTM Classification," 2017 International Conference on Digital Image Computing: Techniques and Applications (DICTA), Nov. 2017, 9 Pages.

Zihang Gao, "5G Traffic Prediction Based on Deep Learning," Computational Intelligence and Neuroscience, 2022, 5 Pages.

Dwivedi et al., "Positioning in 5G networks," EEE Communications Magazine, vol. 59, No. 11, Feb. 2021, 7 Pages.

"Mobile network traffic forecasting," Website: https://github.com/Aujasvi-Moudgil/Forecasting-Mobile-Network-Traffic, Accessed Nov. 2023, 4 Pages.

Abdelhamid et al., "Waterwheel Plant Algorithm: A Novel Metaheuristic Optimization Method," Processes, vol. 11, No. 5, 2023, 25 Pages.

Nikravesh et al., "Mobile Network Traffic Prediction Using MLP, MLPWD, and SVM," 2016 IEEE International Congress on Big Data (BigData Congress), Jun. 2016, 17 Pages.

Xu et al., "A Survey on Resource Allocation for 5G Heterogeneous Networks: Current Research, Future Trends and Challenges," IEEE Communications Surveys & Tutorials, Feb. 2021, 29 Pages.

Aceto et al., "Characterization and Prediction of Mobile-App Traffic Using Markov Modeling," IEEE Transactions on Network and Service Management, Jan. 2021, 20 Pages.

Lai et al., "Deep Learning Based Traffic Prediction Method for Digital Twin Network," Cognitive Computation, 2023, 19 Pages.

Gupta et al., "Deep-Learning Based Mobile-Traffic Forecasting for Resource Utilization in 5G Network Slicing," Proceedings of International conference on Internet of Things and connected technologies, Jul. 2020, 11 Pages.

\* cited by examiner

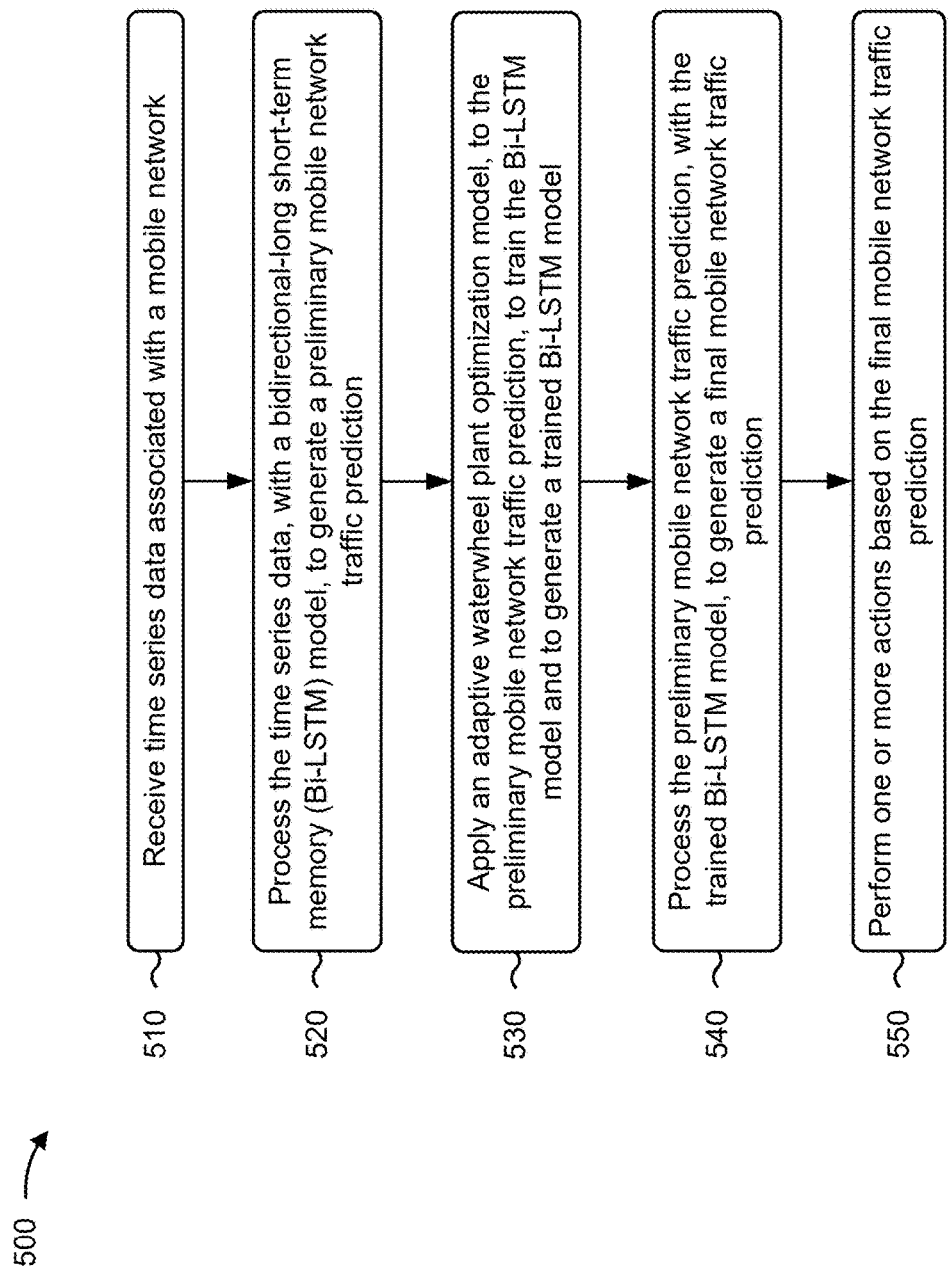

SYSTEMS AND METHODS FOR UTILIZING MODELS TO PREDICT HETEROGENEOUS MOBILE NETWORK TRAFFIC

BACKGROUND

The telecommunications industry has seen a rapid evolution with technologies that deliver significantly greater data speeds and capacity. The greater data speeds and capacity has been accompanied by a substantial increase in mobile network traffic. Network operators must ensure high quality service and quality of experience (QoE) to maintain customer satisfaction, necessitating an accurate and timely prediction of mobile network traffic.

BRIEF DESCRIPTION OF THE DRAWINGS

FIG. 5 is a flowchart of an example process for utilizing models to predict mobile network traffic.

DETAILED DESCRIPTION OF EXAMPLE EMBODIMENTS

Figure 1A:
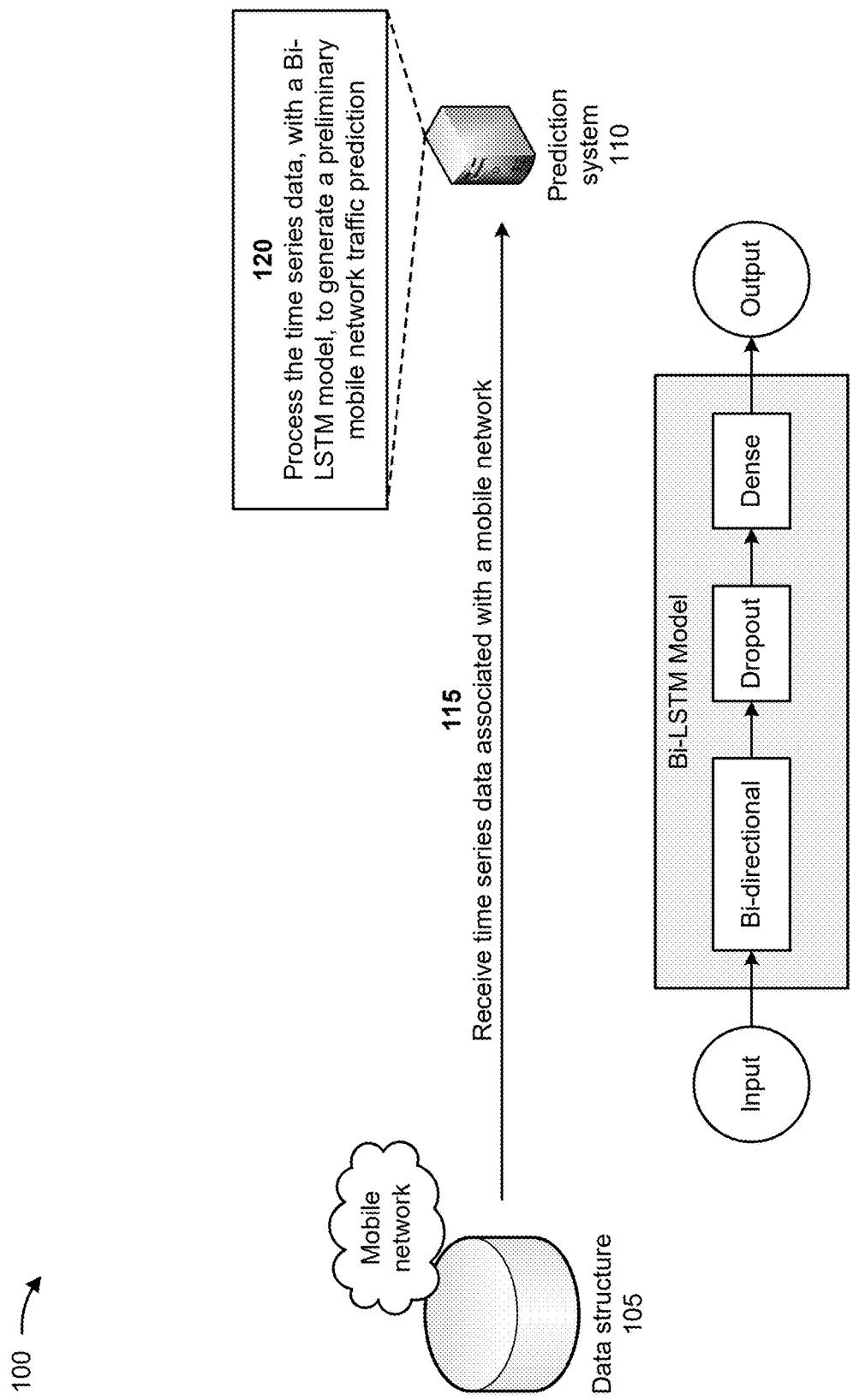
FIGS. 1A-1E are diagrams of an example associated with utilizing models to predict mobile network traffic.

The following detailed description of example implementations refers to the accompanying drawings. The same reference numbers in different drawings may identify the same or similar elements.

Predicting mobile network traffic is a complex task due to the heterogeneous and nonlinear nature of mobile network traffic loads. Current techniques for predicting mobile network traffic, such as classic models, machine learning models, and deep learning models, often struggle with unpredictable characteristics of mobile network traffic. Current techniques for predicting mobile network traffic are insufficient for long-term forecasting, and the rapid increase in traffic volume from numerous network devices exacerbates scalability issues of the current techniques. Furthermore, the latency introduced by some techniques can degrade service in a mobile network. Thus, current techniques for predicting mobile network traffic consume computing resources (e.g., processing resources, memory resources, communication resources, and/or the like), networking resources, and/or other resources associated with failing to handle the complexity and volume of mobile network traffic, failing to adapt to changing mobile network traffic patterns, providing inaccurate long-term forecasts of mobile network traffic, predicting mobile network traffic with multiple prediction errors and in an untimely manner, and/or the like.

Some implementations described herein provide a prediction system that utilizes improved models to predict mobile network traffic. For example, the prediction system may receive time series data associated with a mobile network, and may process the time series data, with a bidirectional-long short-term memory (Bi-LSTM) model, to generate a preliminary mobile network traffic prediction. The prediction system may apply an adaptive waterwheel plant optimization model, to the preliminary mobile network traffic prediction, to train the Bi-LSTM model. The prediction system may process the preliminary mobile network traffic prediction, with the trained Bi-LSTM model, to generate a final mobile network traffic prediction, and may perform one or more actions based on the final mobile network traffic prediction.

In this way, the prediction system utilizes models to predict mobile network traffic. For example, the prediction system may predict mobile network traffic in a mobile network using a Bi-LSTM model. The prediction system may train the Bi-LSTM model utilizing an adaptive waterwheel plant optimization model that incorporates an adaptive concept with a water wheel plant model to minimize prediction error. The prediction system may collect historical mobile network traffic for training the Bi-LSTM model and analyzing patterns in the mobile network traffic. The bidirectional capabilities of the Bi-LSTM model enhance the accuracy and speed of the mobile network traffic prediction, and the adaptive waterwheel plant optimization model reduces prediction errors, such as a mean absolute percentage error (MAPE), a mean square error (MSE), and a root mean square error (RMSE). The prediction system may adjust network resource allocation of the mobile network based on the predicted mobile network traffic and to optimize network efficiency and resource utilization. Thus, the prediction system may conserve computing resources, networking resources, and/or other resources that would have otherwise been consumed by failing to handle the complexity and volume of mobile network traffic, failing to adapt to changing mobile network traffic patterns, providing inaccurate long-term forecasts of mobile network traffic, predicting mobile network traffic with multiple prediction errors and in an untimely manner, and/or the like.

FIGS. 1A-1E are diagrams of an example 100 associated with utilizing models to predict mobile network traffic. As shown in FIGS. 1A-1E, example 100 includes a data structure 105 associated with a prediction system 110. The data structure 105 may include a data structure (e.g., a database, a table, a list, and/or the like) that stores data associated with a mobile network. The prediction system 110 may include a system that utilizes models to predict mobile network traffic. Further details of the data structure 105 and the prediction system 110 are provided elsewhere herein.

As shown in FIG. 1A, and by reference number 115, the prediction system 110 may receive time series data associated with a mobile network. For example, the mobile network may generate traffic data, which is time series data, and may store the time series data in the data structure 105. The prediction system 110 may continuously receive the time series data associated with the mobile network from the data structure 105, may periodically receive the time series data associated with the mobile network from the data structure 105, may receive the time series data associated with the mobile network from the data structure 105 based on requesting the time series data from the data structure 105, and/or the like. In some implementations, the prediction system 110 may receive the time series data directly from the mobile network rather than from the data structure 105.

In some implementations, the time series data may include verifiable information that is used to assess future results (e.g., mobile traffic prediction). The time series may be mathematically modeled as:

$$\varphi = \{J_1, J_2, \ldots, J_\mu, \ldots, J_\aleph\}; 1 \leq \mu \leq \aleph \qquad (1)$$

where φ is a time series dataset, N represents the overall amount of data, and $J_\mu$ indicates the time series data situated at the $\mu^{th}$ index of the dataset. In some implementations, the time series data include historical mobile network traffic data to be used for training the Bi-LSTM model described herein. The historical mobile network traffic data may provide an understanding a past traffic patterns and behaviors, and may serves as a foundation for training predictive models that can forecast future mobile network demands.

As further shown in FIG. 1A, and by reference number 120, the prediction system 110 may process the time series data, with a Bi-LSTM model, to generate a preliminary mobile network traffic prediction. For example, the prediction system 110 may be associated with a Bi-LSTM model includes a bidirectional layer, a dropout layer, and a dense layer, as shown in FIG. 1A. In some implementations, the prediction system 110 may process the time series data, bidirectionally with the Bi-LSTM model, to generate the preliminary mobile network traffic prediction. For example, the Bi-LSTM model may process the time series data in both forward and backward directions (e.g., bidirectionally), may utilize the sequential nature of time series data to better capture temporal dependencies within traffic patterns.

The prediction system 110 may utilize the Bi-LSTM model for predicting mobile network traffic (e.g., the preliminary mobile network traffic prediction). The time series data $J_\mu$ is received as input to the Bi-LSTM. In contrast to conventional one directional LSTM models that only learn from prior data, the forward layer and the backward layer of the Bi-LSTM model may learn from prior data and future data since the data is processed bidirectionally. The Bi-LSTM model may be expressed as follows:

$$\vec{p}_t = LSTM(N_t, \vec{p}_{t-1}; \vec{S}) \quad (2)$$

$$\overleftarrow{p}_t = LSTM(N_t, \overleftarrow{p}_{t-1}; \overleftarrow{S}) \quad (3)$$

$$C_{Ft} = S_{\overrightarrow{pC_F}}\vec{p}_t + S_{\overleftarrow{pC_F}}\overleftarrow{p}_t + k_{C_F}, \quad (4)$$

where N indicates the input sequence (e.g., the data $J_\mu$), various weight matrices are denoted by S, hidden states of the forward and backward layers are represented as $\vec{p}_t$ and $\overleftarrow{p}_t$, weight matrices for the forward and backward layers are indicated as $\vec{S}$ and $\overleftarrow{S}$, time is specified as t, a bias vector is specified as k, and $C_F$ refers to the output sequence.

In every LSTM cell, the hidden state may be recognized by a forget gate δ, an input gate ε, an output gate A, and a cell state γ through the following equations:

$$\varepsilon_t = h(S_{N\varepsilon}N_t + S_{p\varepsilon}p_{t-1} + S_{\Upsilon\varepsilon}\Upsilon_{t-1} + k_\varepsilon) \quad (5)$$

$$\wp_t = h(S_{N\wp}N_t + S_{p\wp}p_{t-1} + S_{\Upsilon\wp}\Upsilon_{t-1} + k_\wp) \quad (6)$$

$$\Upsilon_t = \wp_t \Upsilon_{t-1} + \varepsilon_t \tanh(S_{N\Upsilon}N_t + S_{p\Upsilon}p_{t-1} + k_\wp) \quad (7)$$

$$A_t = h(S_{NA_t}N_t + S_{pA_t}p_{t-1} + S_{\Upsilon A_t}\Upsilon_t + k_{A_t}) \quad (8)$$

$$p_t = A_t \tanh(\Upsilon_t) \quad (9)$$

The function h(·) in equations (5) through (9) represents a sigmoid activation function. An output attained from Bi-LSTM is $C_F$.

Figure 1B:
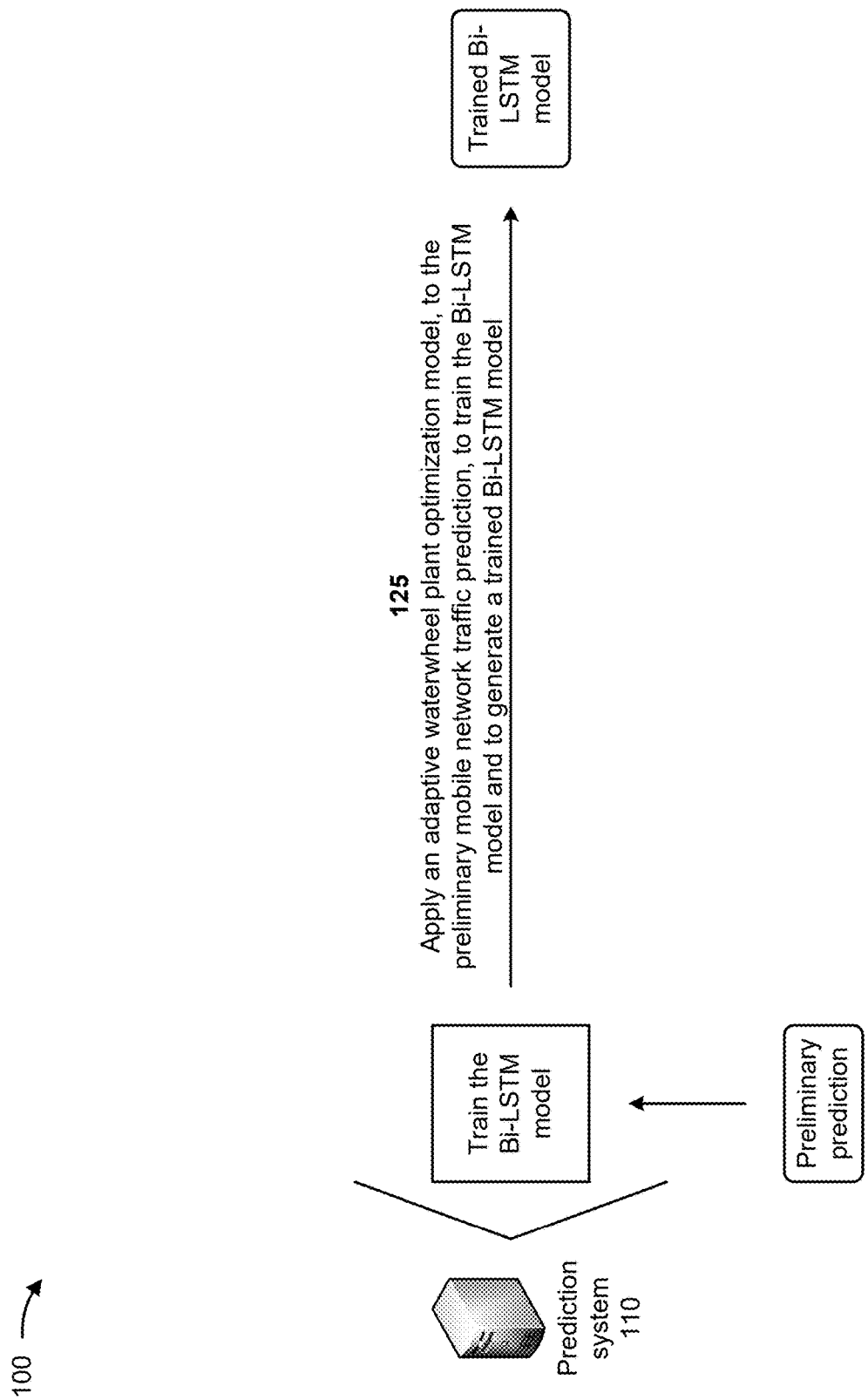

As shown in FIG. 1B, and by reference number 125, the prediction system 110 may apply an adaptive waterwheel plant optimization model, to the preliminary mobile network traffic prediction, to train the Bi-LSTM model. For example, the prediction system 110 may apply a model, such as an adaptive waterwheel plant optimization model, to train the Bi-LSTM model (e.g., by the applying the model to the preliminary mobile network traffic prediction). The prediction system 110 may provide an efficient approach for mobile network traffic prediction using the adaptive waterwheel plant optimization model and the Bi-LSTM model. The prediction system 110 may train the Bi-LSTM model utilizing a new optimization model (e.g., the adaptive waterwheel plant optimization model), which is an amalgamation of an adaptive concept and a waterwheel plant model. An LSTM model may provide effective performance with minimum service delay. However, the LSTM model fails to analyze more downlink architectures (e.g., ensemble techniques) and fails to enhance the framework with longer-term historical trend data. A diviner model may be utilized for 5G network traffic forecasting, but is unable to predict patterns that are not present in the real world. A convolutional (CNN)+LSTM model may be utilized for 5G network traffic control and forecasting, but experiences greater latency because there are more attach requests in the network. It is difficult to predict network traffic in 5G because of the exponential growth in traffic and the trend toward diversity and heterogeneity. Furthermore, there are scalability problems with a predictive model as a result of the rapid increase in data volume.

In some implementations, the adaptive waterwheel plant optimization model may incorporate an adaptive concept with a water wheel plant model. The adaptive concept may enhance an efficiency and minimize a complexity of the water wheel plant model. The water wheel plant model may attempt to avoid inertia between possible local optima while also ensuring rapid convergence. The adaptive concept may be combined with the water wheel plant model to further enhance classification performance. In some implementations, the adaptive waterwheel plant optimization model may minimize a MAPE, an MSE, an RMSE, and/or the like.

In some implementations, the adaptive waterwheel plant optimization model may include an initialization phase, an objective function evaluation phase, an exploration phase, an exploitation phase, a feasibility reevaluation phase, and a termination phase. In the initialization phase, each waterwheel may represent a potential solution to an optimization issue, and may be expressed as a vector. A matrix utilizing equation (10) may be used to represent a population of the adaptive waterwheel plant optimization model, and may include all of the waterwheels. Equation (11) may be utilized to randomly initialize locations of the waterwheels in a search space.

$$W = \begin{bmatrix} W_1 \\ \vdots \\ W_r \\ \vdots \\ W_\chi \end{bmatrix} = \begin{bmatrix} w_{1,1} & \cdots & w_{1,r} & \cdots & w_{1,c} \\ \vdots & \ddots & \vdots & \ddots & \vdots \\ w_{r,1} & \cdots & w_{r,\beta} & \cdots & w_{r,c} \\ \vdots & \ddots & \vdots & \ddots & \vdots \\ w_{\chi,1} & \cdots & w_{\chi,\beta} & \cdots & w_{\chi,c} \end{bmatrix} \quad (10)$$

$$w_{r,\beta} = lb_\beta + x_{r,\beta} \cdot (ub_\beta - lb_\beta), r = 1, 2, \ldots, \chi, \beta = 1, 2, \ldots, c, \quad (11)$$

where an amount of waterwheels and amount of variables is identified by $\chi$ and c, within the range [0, 1], $x_{r,\beta}$ is a random number, $lb_\beta$ is a lower bound of a $\beta^{th}$ variable, $ub_\beta$ is an upper bound of a $\beta^{th}$ variable, W is a population matrix of the waterwheel location, $W_r$ is an $r^{th}$ candidate solution, and $w_{r,\beta}$ is its $\beta^{th}$ dimension.

In the objective function evaluation phase, a finest solution may be determined utilizing a fitness function, which may be referred to as minimization issue, may describe an average squared difference among original and actual values, and may be expressed as follows:

$$MSE = \frac{1}{\xi}\sum_{F=1}^{\xi}[\eta_F - C_F]^2, \quad (12)$$

where a total number of samples is denoted as $\xi$, MSE is a mean square error, and a targeted output is represented as $\eta_F$ and obtained from the Bi-LSTM model (e.g., indicated as $C_F$).

The exploration phase explores an ability of the adaptive waterwheel plant optimization model to locate an ideal region and to escape from local optima that is increased by simulating a waterwheel attack on an insect, which results in significant shifts in a location of a waterwheel in a search space. A novel position of waterwheel may be determined found by utilizing following equations:

$$\vec{L} = \vec{x_1} \cdot (\vec{W}(l) + 2U) \quad (13)$$

$$\vec{W}(l+1) = \vec{W}(l) + \vec{L} \cdot (2U + \vec{x_2}), \quad (14)$$

where a random variable with values in intervals [0, 2] is denoted by $\vec{x_1}$, a random variable with values in intervals [0, 1] is denoted by $\vec{x_2}$, an exponential variable U has a value in the interval [0, 1], and $\vec{L}$ indicates a diameter of a circle that a waterwheel plant uses to determine potential locations.

An insect may be caught by a waterwheel and moved to a feeding tube. This behavior of a waterwheel may serve as the model for a secondary step of the population update in the adaptive waterwheel plant optimization model. The waterwheel may be moved from a previous location if a goal function value at the novel position is higher, which is shown in following equations:

$$\vec{L} = \vec{x_3} \cdot (U\overrightarrow{W_{best}}(l) + x_3\vec{W}(l)) \quad (15)$$

$$\vec{W}(l+1) = \vec{W}(l) + U\vec{L}, \quad (16)$$

where $\vec{x_3}$ is a random variable within the range of [0, 2], $\vec{W}(l)$ is a present solution at iteration l, and $\overrightarrow{W_{best}}$ is a finest solution. A subsequent mutation may be employed to confirm that local minima are avoided, if the solution does not enhance after three iterations as follows:

$$\vec{W}(l+1) = (\vec{x_1} + U)\sin\left(\frac{E}{R}\theta\right). \quad (17)$$

From the above equation, E indicates random number within the range of [−5, 5]. A variable R may be made adaptive according to the equation:

$$R = 4 - \left(\frac{l_{max}}{4}0_3\right), \quad (18)$$

where, $l_{max}$ represents a maximum iteration, l represents a current iteration, and $x_3$ represents a random number with value within the range of [0, 2].

In the feasibility re-evaluation phase, the error may be re-evaluated utilizing a solution obtained from equation (12). Moreover, fitness may be utilized to evaluate a viability of an optimal solution for each iteration. In the termination phase, the preceding phases may be iterated until the optimal solution is determined achieved. The following is example syntax that may be utilized by the prediction system 110 to execute the phases described above.

Initialize the location of waterwheel plants
Calculate fitness for each location
Determine finest plant location

```
Set l = 1
While l ≤ L_max do
    Explore waterwheel plant search space utilizing:
        Update L⃗ using equation (13)
        Update W⃗ (l + 1) using equation (14)
        if Solution does not change for three iterations, then
        End if
    Else
        Exploit present solutions to get finest solution
        Update L⃗ using equation (15)
        Update W⃗ (l + 1) using equation (16)
        if Solution does not change for three iterations, then
            Update W⃗ (l + 1) by using equation (17)
        End if
    End if
    Reduce value of K exponentially utilizing equation (17)
    Update x, x⃗_1, x⃗_2, x⃗_3, R,
    Calculate fitness function
    Recognize finest position of plant
End while
Return finest solution.
```

Figure 1C:
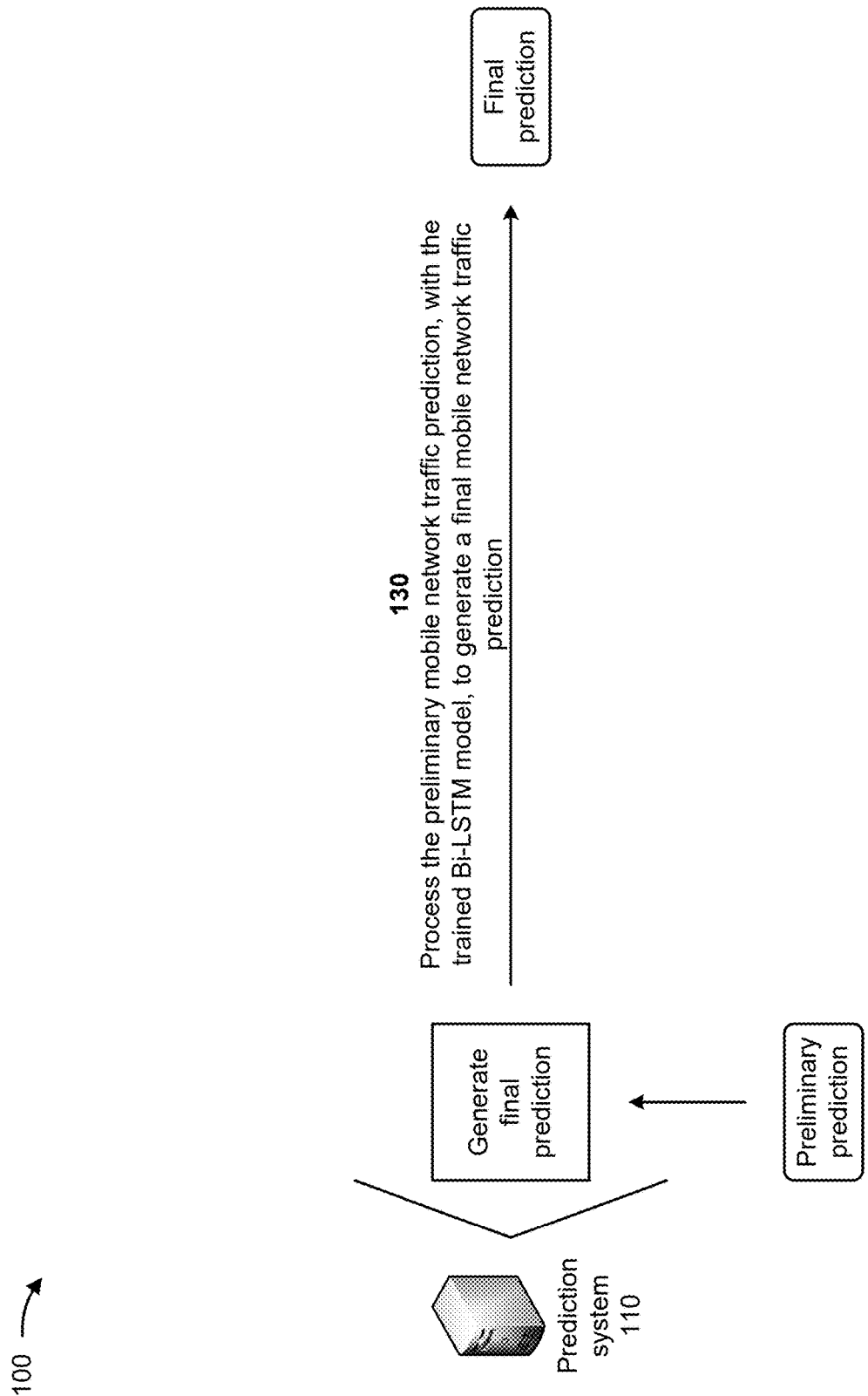

As shown in FIG. 1C, and by reference number 130, the prediction system 110 may process the preliminary mobile network traffic prediction, with the trained Bi-LSTM model, to generate a final mobile network traffic prediction. For example, the prediction system 110 may utilize the trained Bi-LSTM model to generate the final mobile network traffic prediction based on the time series data and/or the preliminary mobile network traffic prediction. Since the trained Bi-LSTM model processes data in both forward and backward directions, the trained Bi-LSTM may utilize the sequential nature of time series data to better capture temporal dependencies within the traffic patterns (e.g., the final mobile network traffic prediction). The use of the adaptive waterwheel plant optimization model to train the Bi-LSTM model may enhance the ability of the trained Bi-LSTM model to forecast traffic with reduced error rates, thereby improving the reliability of the final mobile network traffic prediction. In some implementations, the trained Bi-LSTM model may analyze patterns in the time series data to predict future traffic loads (e.g., the final mobile network traffic prediction). For example, by examining the collected historical data, the trained Bi-LSTM model can identify trends, periodicities, and anomalies within the traffic flows. This analysis provides an understanding of the dynamics of network usage and enables accurate predictions about future traffic loads.

Figure 1D:
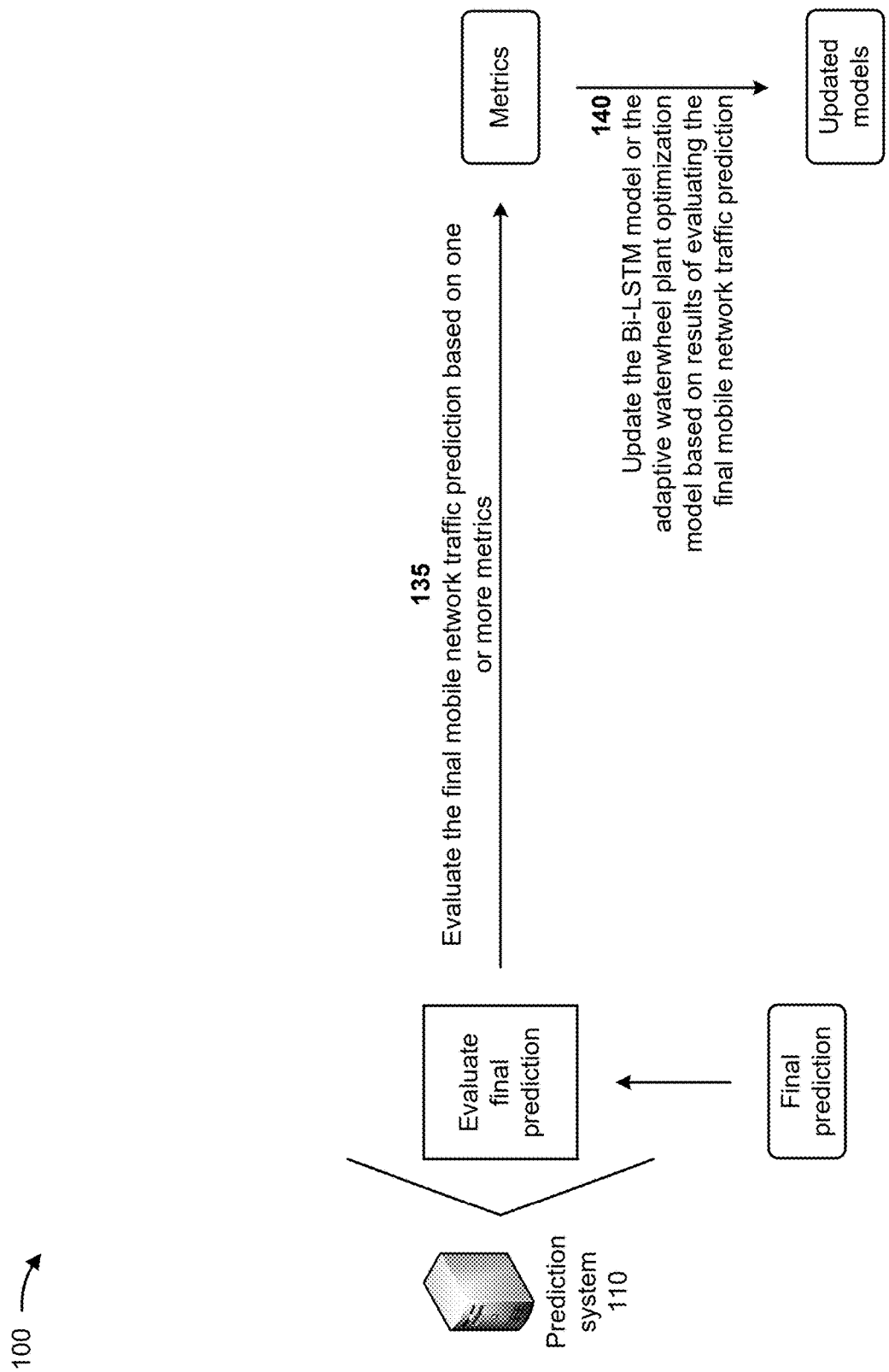

As shown in FIG. 1D, and by reference number 135, the prediction system 110 may evaluate the final mobile network traffic prediction based on one or more metrics. For example, the prediction system 110 may evaluate the performance of the trained Bi-LSTM based on metrics, such as MAPE, MSE, and RMSE. MAPE is a measure of accuracy of a forecasting technique in statistics and may be expressed as follows:

$$MAPE = \frac{1}{\xi}\sum_{F=1}^{\xi}\left|\frac{C_F - \eta_F}{C_F}\right|, \quad (19)$$

where, $\xi$ is a number of samples, $\eta$ is a prediction value, and C is an actual value. MSE is a mean squared difference between original and actual values predicted by the trained Bi-LSTM, and is expressed above in equation (9). RMSE may be used for determining a residual standard deviation, which is a square root of MSE. RMSE may be expressed as:

$$RMSE = \sqrt{\frac{1}{\xi}\sum_{F=1}^{\xi}[\eta_F - C_F]^2}. \quad (20)$$

In some implementations, the prediction system 110 may evaluate the final mobile network traffic prediction based on the one or more metrics (e.g., MAPE, MSE, and RMSE), and may update the Bi-LSTM model or the adaptive waterwheel plant optimization model based on results of evaluating the final mobile network traffic prediction. In some aspects, the prediction system 110 may minimize MAPE in the final mobile network traffic prediction. For example, by fine-tuning the Bi-LSTM model with the adaptive waterwheel plant optimization model, the prediction system 110 may achieve lower MAPE values, indicating a higher accuracy in predicting percentage differences between predicted and actual traffic volumes. In some aspects, the prediction system 110 may minimize MSE in the final mobile network traffic prediction. For example, the adaptive waterwheel plant optimization model's optimization capabilities may reduce an average of the squares of the errors (e.g., the MSE), thereby indicating a more precise prediction model. In some aspects, the prediction system 110 may minimize RMSE in the final mobile network traffic prediction. For example, by reducing the MSE, the prediction system 110 inherently lowers the RMSE, which is the square root of MSE, providing a measure of the standard deviation of the prediction errors.

As further shown in FIG. 1D, and by reference number 140, the prediction system 110 may update the Bi-LSTM model or the adaptive waterwheel plant optimization model based on results of evaluating the final mobile network traffic prediction. For example, the prediction system 110 may analyze the results of evaluating the final mobile network traffic prediction, and may update the Bi-LSTM model or the adaptive waterwheel plant optimization model based on the results to improve the accuracy of subsequent predictions by the trained Bi-LSTM model. In this way, the prediction system 110 conserves computing resources, networking resources, and/or other resources that would have otherwise been consumed by failing to handle the complexity and volume of mobile network traffic.

Figure 1E:
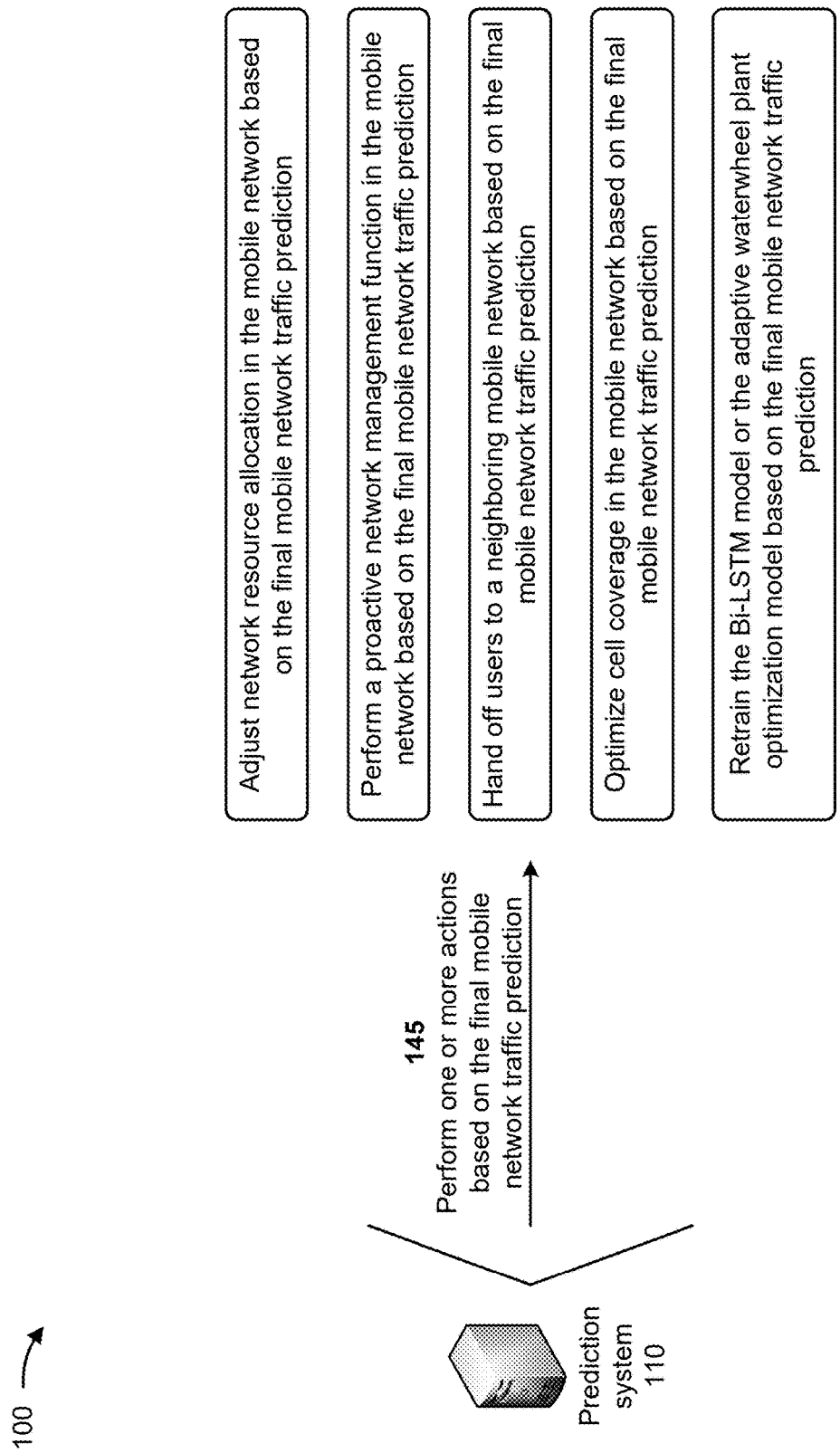

As shown in FIG. 1E, and by reference number 145, the prediction system 110 may perform one or more actions based on the final mobile network traffic prediction. In some implementations, performing the one or more actions includes the prediction system 110 adjusting network resource allocation in the mobile network based on the final mobile network traffic prediction. For example, the prediction system 110 may proactively allocate or de-allocate network resources based on the final mobile network traffic prediction, ensuring that QoS is maintained at optimal levels and reducing a risk of customers experiencing poor service quality. In this way, the prediction system 110 conserves computing resources, networking resources, and/or other resources that would have otherwise been consumed by failing to adapt to changing mobile network traffic patterns.

In some implementations, performing the one or more actions includes the prediction system 110 performing a proactive network management function in the mobile network based on the final mobile network traffic prediction. For example, the prediction system 110 may take preemptive measures in the mobile network based on the final mobile network traffic prediction, such as caching content closer to users or adjusting routing protocols to optimize network performance in anticipation of traffic spikes. In this way, the prediction system 110 conserves computing resources, networking resources, and/or other resources that would have otherwise been consumed by providing and utilizing inaccurate long-term forecasts of mobile network traffic.

In some implementations, performing the one or more actions includes the prediction system 110 handing off users to a neighboring mobile network based on the final mobile network traffic prediction. For example, to balance the load across the mobile network and prevent congestion, the prediction system 110 may predictively transfer users from a heavily loaded mobile network to a neighboring mobile network with more available capacity. In this way, the prediction system 110 conserves computing resources, networking resources, and/or other resources that would have otherwise been consumed by predicting mobile network traffic with multiple prediction errors and in an untimely manner.

In some implementations, performing the one or more actions includes the prediction system 110 optimizing cell coverage in the mobile network based on the final mobile network traffic prediction. For example, the prediction system 110 may adjust power levels and coverage areas of cell towers in the mobile network to match the final mobile network traffic prediction, ensuring efficient use of the network infrastructure. In this way, the prediction system 110 conserves computing resources, networking resources, and/or other resources that would have otherwise been consumed by failing to handle the complexity and volume of mobile network traffic.

In some implementations, performing the one or more actions includes the prediction system 110 retraining the Bi-LSTM model or the adaptive waterwheel plant optimization model based on the final mobile network traffic prediction. For example, the prediction system 110 may utilize the final mobile network traffic prediction as additional training data for retraining the Bi-LSTM model or the adaptive waterwheel plant optimization model, thereby increasing the quantity of training data available for training the Bi-LSTM model or the adaptive waterwheel plant optimization model. Accordingly, the prediction system 110 may conserve computing resources associated with identifying, obtaining, and/or generating historical data for training the Bi-LSTM model or the adaptive waterwheel plant optimization model relative to other systems for identifying, obtaining, and/or generating historical data for training machine learning models.

In this way, the prediction system 110 utilizes models to predict mobile network traffic. For example, the prediction system 110 may predict mobile network traffic in a mobile network using a Bi-LSTM model. The prediction system 110 may train the Bi-LSTM model utilizing an adaptive waterwheel plant optimization model that incorporates an adaptive concept with a water wheel plant model to minimize prediction error. The prediction system 110 may collect historical mobile network traffic for training the Bi-LSTM model and analyzing patterns in the mobile network traffic. The bidirectional capabilities of the Bi-LSTM model enhance the accuracy and speed of the mobile network traffic prediction, and the adaptive waterwheel plant optimization model reduces prediction errors, such as a MAPE, an MSE, and an RMSE. The prediction system 110 may adjust network resource allocation of the mobile network based on the predicted mobile network traffic and to optimize network efficiency and resource utilization. Thus, the prediction system 110 may conserve computing resources, networking resources, and/or other resources that would have otherwise been consumed by failing to handle the complexity and volume of mobile network traffic, failing to adapt to changing mobile network traffic patterns, providing inaccurate long-term forecasts of mobile network traffic, predicting mobile network traffic with multiple prediction errors and in an untimely manner, and/or the like.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
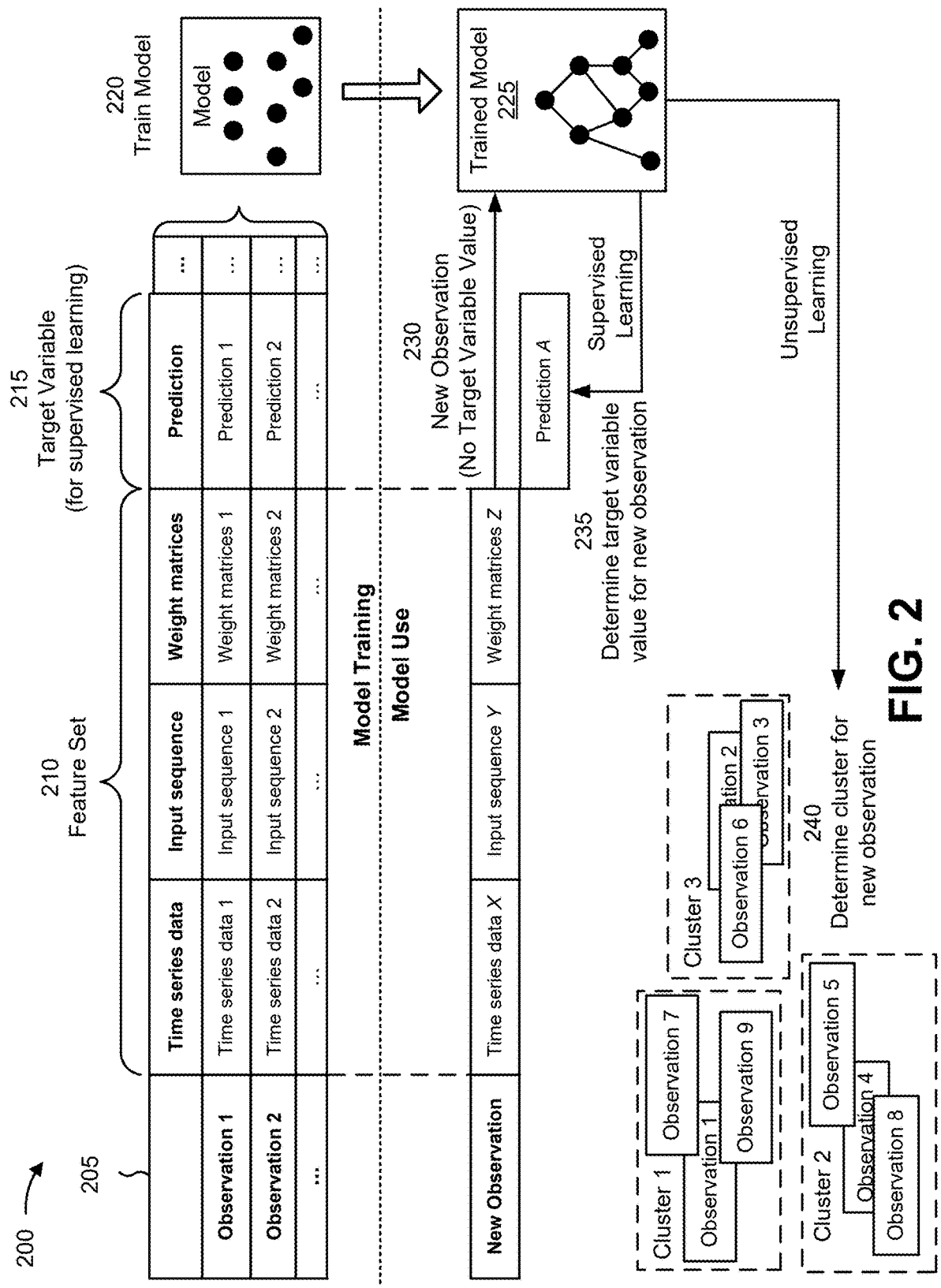
FIG. 2 is a diagram illustrating an example of training and using a machine learning model.

FIG. 2 is a diagram illustrating an example 200 of training and using a machine learning model for predicting mobile network traffic. The machine learning model training and usage described herein may be performed using a machine learning system. The machine learning system may include or may be included in a computing device, a server, a cloud computing environment, and/or the like, such as the prediction system 110 described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the prediction system 110, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the prediction system 110. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of characteristics, a second feature of geographic information, a third feature of a network service, and so on. As shown, for a first observation, the first feature may have a value of characteristics 1, the second feature may have a value of geographic information 1, the third feature may have a value of network service 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable may be entitled "propensities" and may include a value of propensities 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of characteristics X, a second feature of geographic information Y, a third feature of network service Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of propensities A for the target variable of the propensities for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a characteristics cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a geographic information cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to predict mobile network traffic. The machine learning system enables recognition and/or identification of tens, hundreds, thousands, or millions of features and/or feature values for tens, hundreds, thousands, or millions of observations, thereby increasing accuracy and consistency and reducing delay associated with predicting mobile network traffic relative to requiring computing resources to be allocated for tens, hundreds, or thousands of operators to manually predict mobile network traffic.

As indicated above, FIG. 2 is provided as an example. Other examples may differ from what is described in connection with FIG. 2.

Figure 3:
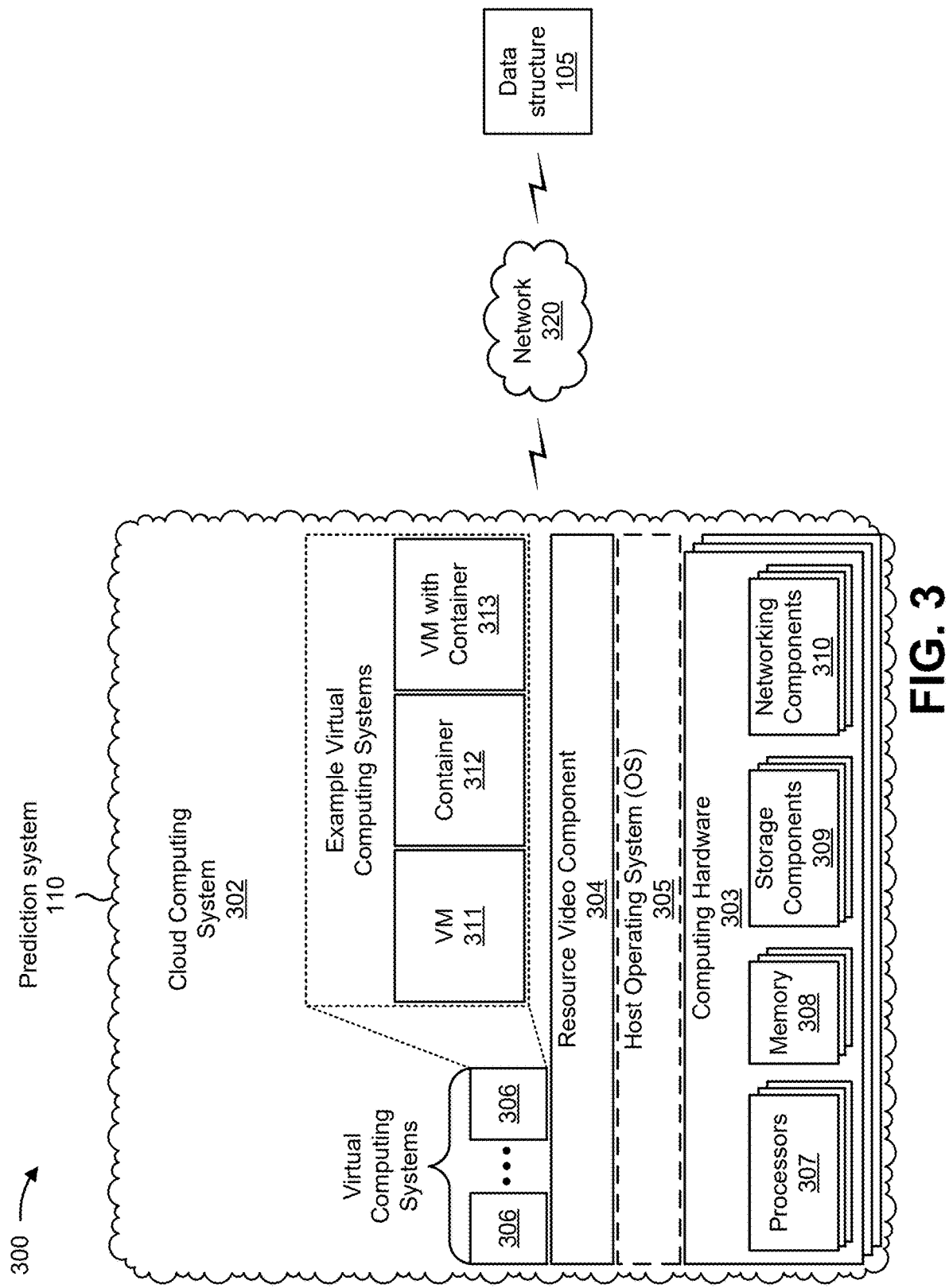
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include the prediction system 110, which may include one or more elements of and/or may execute within a cloud computing system 302. The cloud computing system 302 may include one or more elements 303-313, as described in more detail below. As further shown in FIG. 3, the environment 300 may include the data structure 105 and/or a network 320. Devices and/or elements of the environment 300 may interconnect via wired connections and/or wireless connections.

The data structure 105 may include one or more devices capable of receiving, generating, storing, processing, and/or providing information, as described elsewhere herein. The data structure 105 may include a communication device and/or a computing device. For example, the data structure 105 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data structure 105 may communicate with one or more other devices of the environment 300, as described elsewhere herein.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of the computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using the computing hardware 303. As shown, the virtual computing system 306 may include a virtual machine 311, a container 312, or a hybrid environment 313 that includes a virtual machine and a container, among other examples. The virtual computing system 306 may execute one or more applications using a file system that includes binary files, software libraries, and/or other resources required to execute applications on a guest operating system (e.g., within the virtual computing system 306) or the host operating system 305.

Although the prediction system 110 may include one or more elements 303-313 of the cloud computing system 302, may execute within the cloud computing system 302, and/or may be hosted within the cloud computing system 302, in some implementations, the prediction system 110 may not be cloud-based (e.g., may be implemented outside of a cloud computing system) or may be partially cloud-based. For example, the prediction system 110 may include one or more devices that are not part of the cloud computing system 302, such as a device 400 of FIG. 4, which may include a standalone server or another type of computing device. The prediction system 110 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
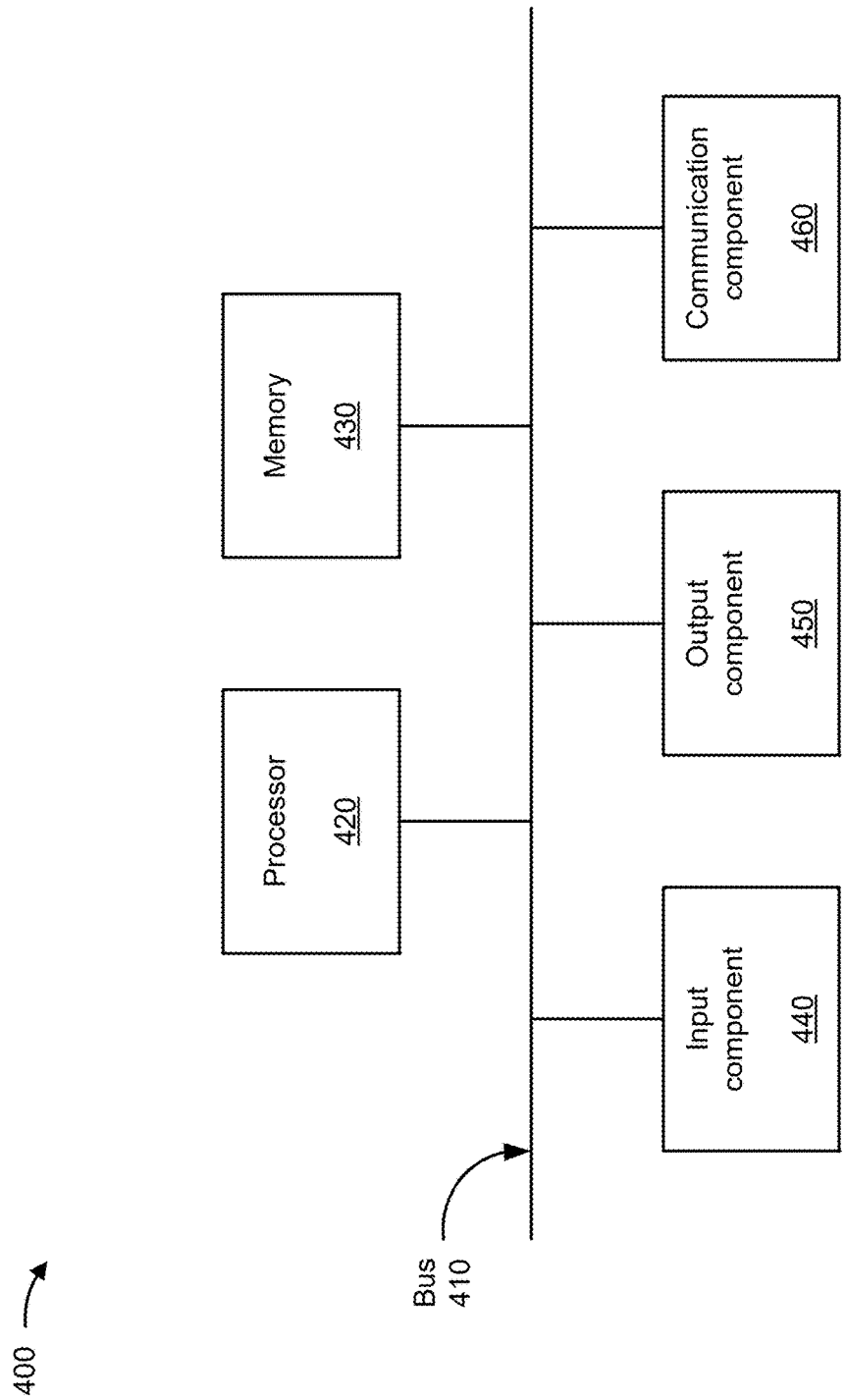
FIG. 4 is a diagram of example components of one or more devices of FIG. 3.

FIG. 4 is a diagram of example components of a device 400, which may correspond to the data structure 105 and/or the prediction system 110. In some implementations, the data structure 105 and/or the prediction system 110 may include one or more devices 400 and/or one or more components of the device 400. As shown in FIG. 4, the device 400 may include a bus 410, a processor 420, a memory 430, an input component 440, an output component 450, and a communication component 460.

The bus 410 includes one or more components that enable wired and/or wireless communication among the components of the device 400. The bus 410 may couple together two or more components of FIG. 4, such as via operative coupling, communicative coupling, electronic coupling, and/or electric coupling. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 stores information, instructions, and/or software (e.g., one or more software applications) related to the operation of the device 400. In some implementations, the memory 430 includes one or more memories that are coupled to one or more processors (e.g., the processor 420), such as via the bus 410.

The input component 440 enables the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 enables the device 400 to provide output, such as via a display, a speaker, and/or a light-emitting diode. The communication component 460 enables the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., the memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 depicts a flowchart of an example process 500 for utilizing models to predict mobile network traffic. In some implementations, one or more process blocks of FIG. 5 may be performed by a device (e.g., the prediction system 110). In some implementations, one or more process blocks of FIG. 5 may be performed by another device or a group of devices separate from or including the device. Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving time series data associated with a mobile network (block 510). For example, the device may receive time series data associated with a mobile network, as described above. In some implementations, the time series data includes historical data associated with the mobile network.

As further shown in FIG. 5, process 500 may include processing the time series data, with a Bi-LSTM model, to generate a preliminary mobile network traffic prediction (block 520). For example, the device may process the time series data, with a Bi-LSTM model, to generate a preliminary mobile network traffic prediction, as described above. In some implementations, the Bi-LSTM model includes a bidirectional layer, a dropout layer, and a dense layer. In some implementations, processing the time series data, with the Bi-LSTM model, to generate the preliminary mobile network traffic prediction includes processing the time series data, bidirectionally with the Bi-LSTM model, to generate the preliminary mobile network traffic prediction.

As further shown in FIG. 5, process 500 may include applying an adaptive waterwheel plant optimization model, to the preliminary mobile network traffic prediction, to train the Bi-LSTM model and to generate a trained Bi-LSTM model (block 530). For example, the device may apply an adaptive waterwheel plant optimization model, to the preliminary mobile network traffic prediction, to train the Bi-LSTM model and to generate a trained Bi-LSTM model, as described above. In some implementations, the adaptive waterwheel plant optimization model incorporates an adaptive concept with a water wheel plant model. In some implementations, the adaptive concept enhances an efficiency and minimizes a complexity of the water wheel plant model. In some implementations, the adaptive waterwheel plant optimization model includes an initialization phase, an objective function evaluation phase, an exploration phase, an exploitation phase, a feasibility reevaluation phase, and a termination phase. In some implementations, the adaptive waterwheel plant optimization model minimizes one or more of a mean absolute percentage error, a mean square error, or a root mean square error.

As further shown in FIG. 5, process 500 may include processing the preliminary mobile network traffic prediction, with the trained Bi-LSTM model, to generate a final mobile network traffic prediction (block 540). For example, the device may process the preliminary mobile network traffic prediction, with the trained Bi-LSTM model, to generate a final mobile network traffic prediction, as described above.

As further shown in FIG. 5, process 500 may include performing one or more actions based on the final mobile network traffic prediction (block 550). For example, the device may perform one or more actions based on the final mobile network traffic prediction, as described above. In some implementations, performing the one or more actions based on the final mobile network traffic prediction includes one or more of generating an alert for a mobile network operator regarding potential service degradation based on the final mobile network traffic prediction, or adjusting network resource allocation in the mobile network based on the final mobile network traffic prediction.

In some implementations, performing the one or more actions based on the final mobile network traffic prediction includes one or more of performing a proactive network management function in the mobile network based on the final mobile network traffic prediction, or handing off users to a neighboring mobile network based on the final mobile network traffic prediction. In some implementations, performing the one or more actions based on the final mobile network traffic prediction includes one or more of optimizing cell coverage in the mobile network based on the final mobile network traffic prediction, or retraining the Bi-LSTM model or the adaptive waterwheel plant optimization model based on the final mobile network traffic prediction.

In some implementations, process 500 includes evaluating the final mobile network traffic prediction based on one or more metrics, and updating the Bi-LSTM model or the adaptive waterwheel plant optimization model based on results of evaluating the final mobile network traffic prediction. In some implementations, process 500 includes analyzing patterns in the final mobile network traffic prediction to predict future mobile network traffic loads.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device, time series data associated with a mobile network;
   processing, by the device, the time series data, with a bidirectional-long short-term memory (Bi-LSTM) model, to generate a preliminary mobile network traffic prediction;
   applying, by the device, an adaptive waterwheel plant optimization model, to the preliminary mobile network traffic prediction, to train the Bi-LSTM model and to generate a trained Bi-LSTM model;
   processing, by the device, the preliminary mobile network traffic prediction, with the trained Bi-LSTM model, to generate a final mobile network traffic prediction; and
   performing, by the device, one or more actions based on the final mobile network traffic prediction, wherein the one or more actions include adjusting network resource allocation in the mobile network based on the final mobile network traffic prediction.

2. The method of claim 1, further comprising:
   evaluating the final mobile network traffic prediction based on one or more metrics; and
   updating the Bi-LSTM model or the adaptive waterwheel plant optimization model based on results of evaluating the final mobile network traffic prediction.

3. The method of claim 1,
   wherein the Bi-LSTM model includes a bidirectional layer, a dropout layer, and a dense layer.

4. The method of claim 1,
   wherein processing the time series data, with the Bi-LSTM model, to generate the preliminary mobile network traffic prediction comprises:
   processing the time series data, bidirectionally with the Bi-LSTM model, to generate the preliminary mobile network traffic prediction.

5. The method of claim 1,
   wherein the adaptive waterwheel plant optimization model incorporates an adaptive concept with a water wheel plant model.

6. The method of claim 5,
   wherein the adaptive concept enhances an efficiency and minimizes a complexity of the water wheel plant model.

7. The method of claim 1,
   wherein the adaptive waterwheel plant optimization model includes an initialization phase, an objective function evaluation phase, an exploration phase, an exploitation phase, a feasibility reevaluation phase, and a termination phase.

8. A device, comprising:
   one or more processors configured to:
   receive time series data associated with a mobile network;
   process the time series data, with a bidirectional-long short-term memory (Bi-LSTM) model, to generate a preliminary mobile network traffic prediction,
   wherein the Bi-LSTM model includes a bidirectional layer, a dropout layer, and a dense layer;
   apply an adaptive waterwheel plant optimization model, to the preliminary mobile network traffic prediction, to train the Bi-LSTM model and to generate a trained Bi-LSTM model;
   process the preliminary mobile network traffic prediction, with the trained Bi-LSTM model, to generate a final mobile network traffic prediction; and
   perform one or more actions based on the final mobile network traffic prediction, wherein the one or more actions include adjusting network resource allocation in the mobile network based on the final mobile network traffic prediction.

9. The device of claim 8,
   wherein the adaptive waterwheel plant optimization model minimizes one or more of a mean absolute percentage error, a mean square error, or a root mean square error.

10. The device of claim 8,
    wherein the one or more processors are further configured to:
    analyze patterns in the final mobile network traffic prediction to predict future mobile network traffic loads.

11. The device of claim 8,
    wherein the time series data includes historical data associated with the mobile network.

12. The device of claim 8,
    wherein the one or more processors, to perform the one or more actions based on the final mobile network traffic prediction, are configured to:
    generate an alert for a mobile network operator regarding potential service degradation based on the final mobile network traffic prediction.

13. The device of claim 8,
    wherein the one or more processors, to perform the one or more actions based on the final mobile network traffic prediction, are configured to one or more of:
    perform a proactive network management function in the mobile network based on the final mobile network traffic prediction; or hand off users to a neighboring mobile network based on the final mobile network traffic prediction.

14. The device of claim 8,
wherein the one or more processors, to perform the one or more actions based on the final mobile network traffic prediction, are configured to one or more of:
optimize cell coverage in the mobile network based on the final mobile network traffic prediction; or
retrain the Bi-LSTM model or the adaptive waterwheel plant optimization model based on the final mobile network traffic prediction.

15. A non-transitory computer-readable medium storing a set of instructions, the set of instructions comprising:
one or more instructions that, when executed by one or more processors of a device, cause the device to:
receive time series data associated with a mobile network;
process the time series data, with a bidirectional-long short-term memory (Bi-LSTM) model, to generate a preliminary mobile network traffic prediction;
apply an adaptive waterwheel plant optimization model, to the preliminary mobile network traffic prediction, to train the Bi-LSTM model and to generate a trained Bi-LSTM model,
wherein the adaptive waterwheel plant optimization model incorporates an adaptive concept with a water wheel plant model;
process the preliminary mobile network traffic prediction, with the trained Bi-LSTM model, to generate a final mobile network traffic prediction; and
perform one or more actions based on the final mobile network traffic prediction, wherein the one or more actions include adjusting network resource allocation in the mobile network based on the final mobile network traffic prediction.

16. The non-transitory computer-readable medium of claim 15,
wherein the one or more instructions further cause the device to:
evaluate the final mobile network traffic prediction based on one or more metrics; and
update the Bi-LSTM model or the adaptive waterwheel plant optimization model based on results of evaluating the final mobile network traffic prediction.

17. The non-transitory computer-readable medium of claim 15,
wherein the adaptive waterwheel plant optimization model includes an initialization phase, an objective function evaluation phase, an exploration phase, an exploitation phase, a feasibility reevaluation phase, and a termination phase.

18. The non-transitory computer-readable medium of claim 15,
wherein the adaptive waterwheel plant optimization model minimizes one or more of a mean absolute percentage error, a mean square error, or a root mean square error.

19. The non-transitory computer-readable medium of claim 15,
wherein the one or more instructions further cause the device to:
analyze patterns in the final mobile network traffic prediction to predict future mobile network traffic loads.

20. The non-transitory computer-readable medium of claim 15,
wherein the one or more instructions, that cause the device to perform the one or more actions based on the final mobile network traffic prediction, cause the device to one or more of:
generate an alert for a mobile network operator regarding potential service degradation based on the final mobile network traffic prediction;
perform a proactive network management function in the mobile network based on the final mobile network traffic prediction;
hand off users to a neighboring mobile network based on the final mobile network traffic prediction;
optimize cell coverage in the mobile network based on the final mobile network traffic prediction; or
retrain the Bi-LSTM model or the adaptive waterwheel plant optimization model based on the final mobile network traffic prediction.

* * * * *